(12) United States Patent
Volin

(10) Patent No.: US 8,534,682 B2
(45) Date of Patent: Sep. 17, 2013

(54) UNIQUE FIVE-DEVICE-IN-ONE SYSTEM COMPRISING WHEELBARROW, WHEEL HARVEST-BAG TRASH-BAG CADDY, WHEEL TOOL-REFRESHMENT CADDY, DUMP TRUCK, AND HAND TRUCK

(76) Inventor: Dee Volin, Fairview, OR (US)

( * ) Notice: Subject to any disclaimer, the term of this patent is extended or adjusted under 35 U.S.C. 154(b) by 179 days.

(21) Appl. No.: 13/066,740

(22) Filed: Apr. 22, 2011

(65) Prior Publication Data
US 2011/0260420 A1 Oct. 27, 2011

Related U.S. Application Data

(60) Provisional application No. 61/343,247, filed on Apr. 26, 2010.

(51) Int. Cl.
B62B 1/00 (2006.01)
(52) U.S. Cl.
USPC .............. 280/47.31; 280/47.18; 280/651
(58) Field of Classification Search
USPC ............. 280/653, 42, 652, 640, 639, 651, 280/47.18, 47.3
See application file for complete search history.

(56) References Cited

U.S. PATENT DOCUMENTS

| | | | |
|---|---|---|---|
| 2,672,348 A * | 3/1954 | Scott | 280/653 |
| 3,826,511 A * | 7/1974 | Frank | 280/653 |
| 5,222,757 A | 6/1993 | Magyar | |
| 5,433,462 A | 7/1995 | Groleau | |
| 5,806,878 A | 9/1998 | Mroczka | |
| 5,915,706 A | 6/1999 | Mosley | |
| 5,924,708 A | 7/1999 | Bisaillon | |
| 5,971,410 A | 10/1999 | Nichols | |
| 6,017,053 A | 1/2000 | Leger | |
| 6,193,265 B1 | 2/2001 | Yemini | |
| 6,328,331 B1 | 12/2001 | McEnteggart | |
| 6,648,349 B1 | 11/2003 | Waller | |
| 6,764,093 B2 | 7/2004 | Allsop | |
| 6,851,701 B2 | 2/2005 | Tomchak | |
| 6,869,098 B2 | 3/2005 | Tomchak | |
| 6,902,184 B2 * | 6/2005 | Hsu | 280/653 |
| 6,945,545 B2 | 9/2005 | Celli | |
| 6,991,251 B2 | 1/2006 | Tomchak | |
| 7,226,072 B2 | 6/2007 | Shapiro | |
| 7,232,135 B2 | 6/2007 | Robinson | |
| 7,243,939 B2 | 7/2007 | Lowe | |
| 7,296,807 B2 | 11/2007 | Zimmerman | |
| 7,866,686 B2 * | 1/2011 | Conaway et al. | 280/653 |

* cited by examiner

Primary Examiner — Hau Phan

(57) ABSTRACT

A unique five-device-in-one system comprises the five following devices, which are combined into one system to save cost, time, labor, and space, and can change their shapes and functions while in motion and can function, simultaneously: a wheelbarrow, a wheel harvest-bag trash-bag caddy, a wheel tool-refreshment caddy, a dump truck, and a hand truck. The unique five-device-in-one system comprises left and right multi-purpose foldable handles, left and right frames, left and right sleeves, a roll bar, a nut-washer-axle combination, a wheel, a multi-position locking device, left and right multi-purpose shock absorbers, left and right utility-bag spreaders, left and right attaching screws, a quick-release multi-purpose container, expandable tool-carrying pockets, left and right horizontal hooks and loops, left and right vertical hooks and loops, left and right dustpan hooks and loops, and a multi-purpose foldable dustpan.

20 Claims, 8 Drawing Sheets

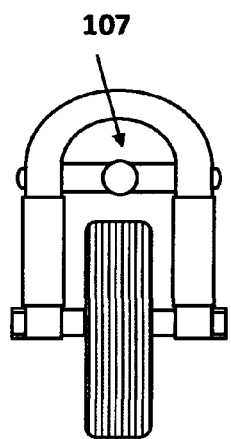
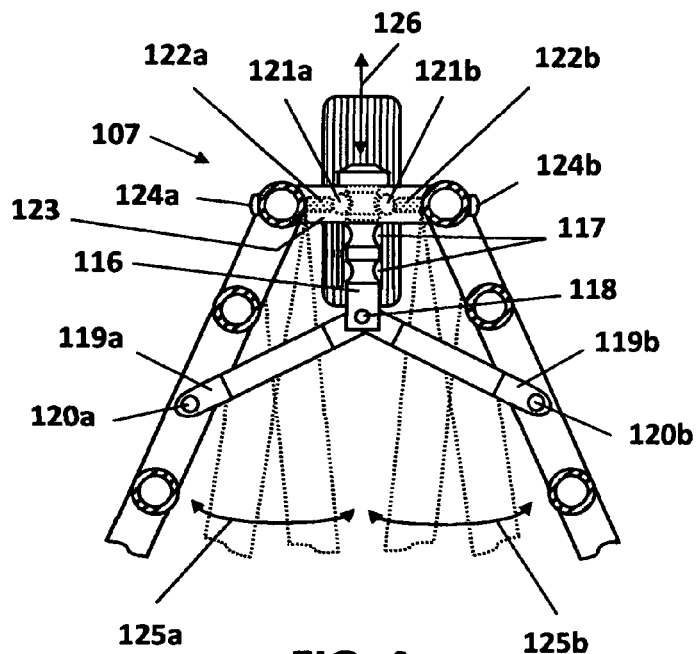
FIG. 3  FIG. 4
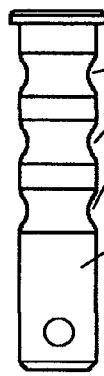
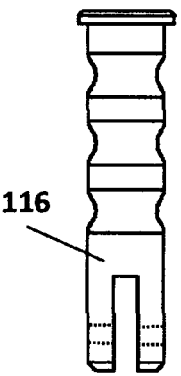
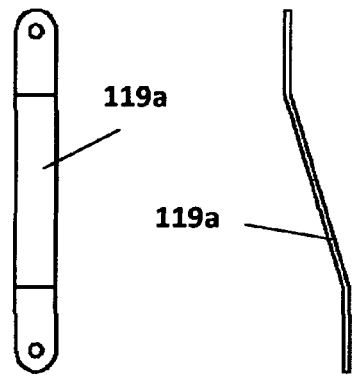
FIG. 5A  FIG. 5B  FIG. 6A  FIG. 6B

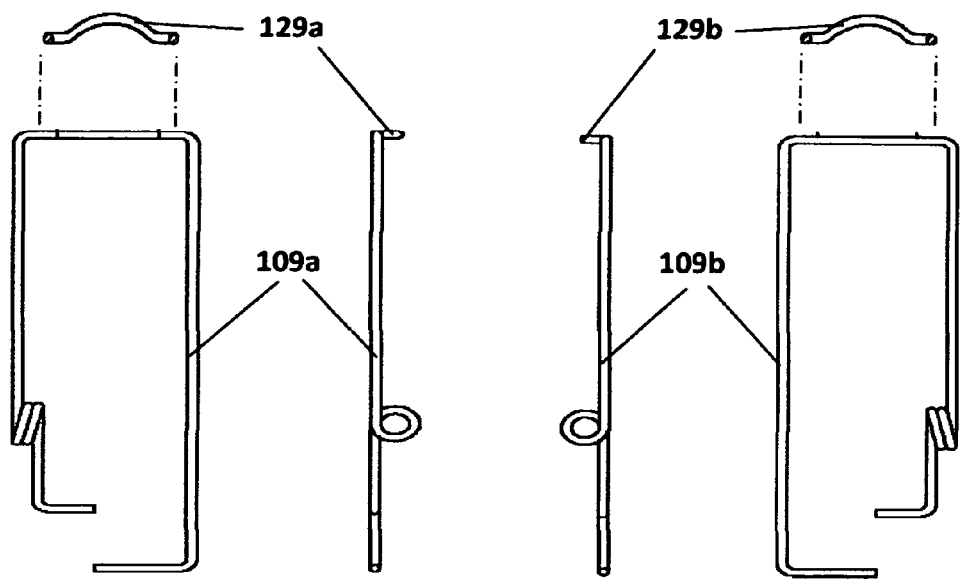
FIG. 10A   FIG. 10B   FIG. 11A   FIG. 11B
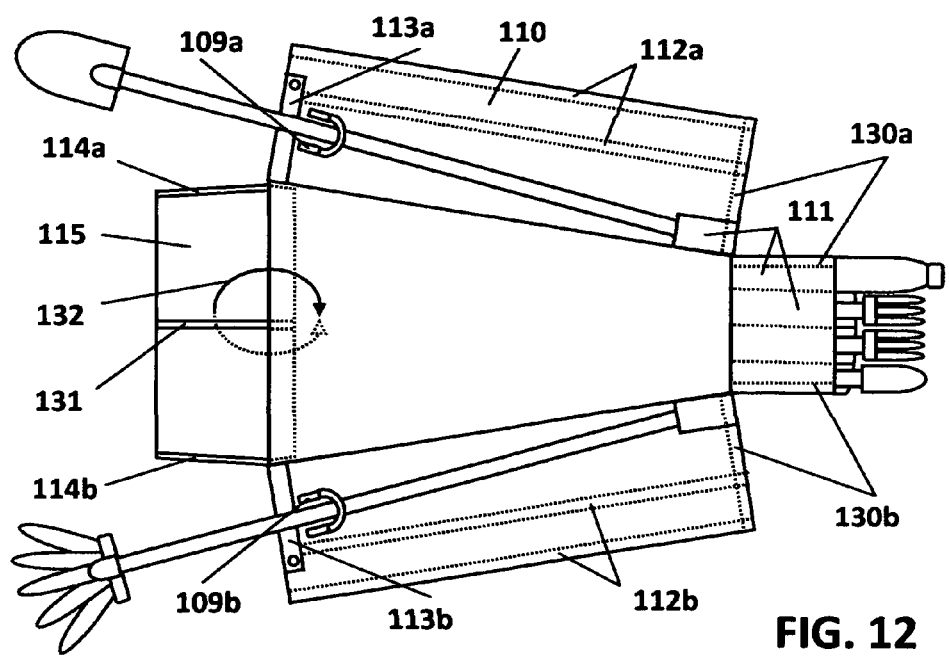
FIG. 12

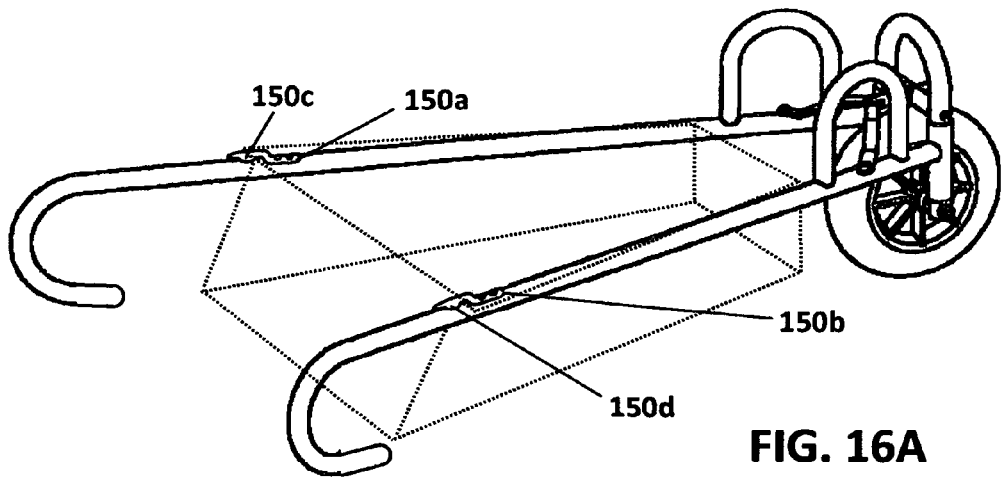
FIG. 16A
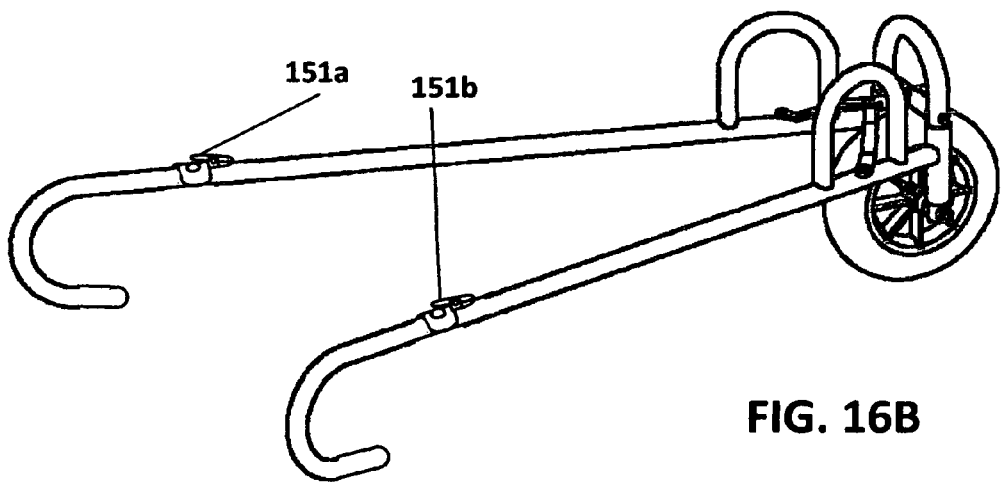
FIG. 16B
   
FIG. 16C   FIG. 16D   FIG. 16E   FIG. 16F

UNIQUE FIVE-DEVICE-IN-ONE SYSTEM COMPRISING WHEELBARROW, WHEEL HARVEST-BAG TRASH-BAG CADDY, WHEEL TOOL-REFRESHMENT CADDY, DUMP TRUCK, AND HAND TRUCK

CROSS-REFERENCE TO RELATED APPLICATIONS

Provisional Patent Application No. 61/343,247 was filed on Apr. 26, 2010.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1) Field of the Invention

The present application is applied for a unique system, which comprises five different devices combined into one. All the five different devices can function simultaneously, and can shift their shapes and functions while they are in motion. The unique five-device-in-one system comprises the five following devices:
  1) A wheelbarrow,
  2) A wheel harvest-bag trash-bag caddy,
  3) A wheel tool-refreshment caddy,
  4) A dump truck, and
  5) A hand truck.

Each of wheelbarrow, wheel harvest-bag trash-bag caddy, wheel tool-refreshment caddy, dump truck, and hand truck is an important part of our life, but the five separate devices mentioned above are expensive, time-consuming, labored, and cumbersome. Accordingly, there are ever-increasing demands for a convenient, affordable device, which combines the five separate devices mentioned above into one to save cost, time, labor, and space.

2) Description of Related Art

Prior-art wheelbarrows heretofore have the problems of not being capable of functioning as five different devices combined into one, nor being capable of functioning as five different devices simultaneously. This creates the problem of requiring many different devices to accomplish the same tasks. This results in cumbersome and hazardous operations, which require more investment, time, labor, and space. A number of cumbersome, hazardous devices have been introduced: U.S. Pat. No. 5,222,757, filed Jun. 19, 1993, to David J. Magyar introduces a wheelbarrow, which can not shift its shape and function while in motion, nor function as a five-device-in-one system; U.S. Pat. No. 5,433,462, filed Jul. 18, 1995, to Rodney J. Groleau introduces a wheelbarrow, which can not shift its shape and function while in motion, nor function as a five-device-in-one system; U.S. Pat. No. 5,806, 878, filed Sep. 15, 1998, David E. Mroczka introduces a wheelbarrow, which can not shift its shape and function while in motion, nor function as a five-device-in-one system; U.S. Pat. No. 5,915,706, filed Jun. 29, 1999, to Keith A. Mosley introduces a wheelbarrow, which can not shift its shape and function while in motion, nor function as a five-device-in-one system; U.S. Pat. No. 5,924,708, filed Jul. 20, 1999, to Gerald J. Bisaillon introduces a wheelbarrow, which can not shift its shape and function while in motion, nor function as a five-device-in-one system; U.S. Pat. No. 5,971,410, filed Oct. 26, 1999, to George Nichols introduces a wheelbarrow, which can not shift its shape and function while in motion, nor function as a five device-in-one system; U.S. Pat. No. 6,017, 053, filed Jan. 25, 2000, to David E. Leger introduces a wheelbarrow, which can not shift its shape and function while in motion, nor function as a five-device-in-one system; U.S. Pat. No. 6,193,265, filed Feb. 27, 2001, to Zvi Yemini introduces a wheelbarrow, which can not shift its shape and function while in motion, nor function as a five-device-in-one system; U.S. Pat. No. 6,328,331, filed Dec. 11, 2001, to Kevin P. McEnteggart introduces a wheelbarrow, which can not shift its shape and function while in motion, nor function as a five-device-in-one system; U.S. Pat. No. 6,648,349, filed Nov. 18, 2003, to Melissa J. Waller introduces a wheelbarrow, which can not shift its shape and function while in motion, nor function as a five-device-in-one system; U.S. Pat. No. 6,764, 093, filed Jul. 20, 2004, to James D. Allsop introduces a wheelbarrow, which can not shift its shape and function while in motion, nor function as a five-device-in-one system; U.S. Pat. No. 6,851,701, filed Feb. 8, 2005, to Michael J. Tomchak introduces a wheelbarrow, which can not shift its shape and function while in motion, nor function as a five-device-in-one system; U.S. Pat. No. 6,869,098, filed Mar. 22, 2005, to Michael J. Tomchak introduces a wheelbarrow, which can not shift its shape and function while in motion, nor function as a five-device-in-one system; U.S. Pat. No. 6,945,545, filed Sep. 20, 2005, to Gluliano Celli introduces a wheelbarrow, which can not shift its shape and function while in motion, nor function as a five-device-in-one system; U.S. Pat. No. 6,991, 251, filed Jan. 31, 2006, to Michael J. Tomchak introduces a wheelbarrow, which can not shift its shape and function while in motion, nor function as a five-device-in-one system; U.S. Pat. No. 7,226,072, filed Jun. 5, 2007, to Richard N. Shapiro introduces a wheelbarrow, which can not shift its shape and function while in motion, nor function as a five-device-in-one system; U.S. Pat. No. 7,232,135, filed Jun. 19, 2007, to Douglas Robison introduces a wheelbarrow, which can not shift its shape and function while in motion, nor function as a five-device-in-one system; U.S. Pat. No. 7,243,939, filed Jul. 17, 2007, to Matthew F. Lowe introduces a wheelbarrow, which can not shift its shape and function while in motion, nor function as a five-device-in-one system; U.S. Pat. No. 7,296, 807, filed Nov. 20, 2007, to Felton Zimmerman introduces a dumping cart, which can not shift its shape and function while in motion, nor function as a five-device-in-one system.

Therefore, prior-art wheelbarrows heretofore teach away from the five-device-in-one system of the present invention.

The unique system comprises five different devices combined into one. All the five different devices can function simultaneously, and can shift their shapes and functions while they are in motion.

With the on-the-fly shape-shifting capability and on-the-fly function-shifting capability, the five-device-in-one system can eliminate the needs for stopping, putting down, unlocking, adjusting, relocking, and picking up the system.

The five-device-in-one system has the following unique features:
  1) On-the-fly shape-shifting capability for changing the shape of the system and automatically locking it in that shape (while the system is in motion), to eliminate the needs for stopping, putting down, unlocking, adjusting, relocking, and picking up the system;
2) On-the-fly function-shifting capability for changing the function of the system and automatically locking it in that function (while the system is in motion), to eliminate the needs for stopping, putting down, unlocking, adjusting, relocking, and picking up the system;
3) On-the-fly width-adjusting capability for changing the width of the system and automatically locking it in that width (while the system is in motion), to carry items or debris of different shapes and sizes and to maneuver easily around objects;
4) Multi-purpose shock absorbers for absorbing shocks and vibrations to reduce fatigue and hand pain, and for functioning as the platform of a hand truck to carry items or debris stacked thereon;
5) Multi-purpose ground-flush dustpan and multi-purpose ground-flush harvest-bag trash-bag caddy:
   a) For conveniently loading and unloading items or debris, at ground level, to reduce fatigue and back pain,
   b) For conveniently holding down flat, at ground level, and protecting the edge of the mouth of a harvest bag, a trash bag, or the container of the system,
   c) For conveniently loading and unloading items or debris, at ground level, in a separate harvest bag or trash bag: to separate different items, to separate different debris, to separate harvested items from debris, and to eliminate the needs for cleaning and/or washing the system after every loading, unloading, and transportation of items or debris, and
   d) For conveniently bagging and/or discarding items and/or debris.
6) Expandable tool-carrying pockets for carrying a plurality of various long-handled tools, short-handled tools, work gloves, refreshments, etc., at the same time: a) to save time, money, and energies, b) to reduce fatigue, hand pain, and back pain, and c) to eliminate frustration;
7) Quick-release multi-purpose container for quickly releasing it from the frame(s) of the system to unload all carried items or debris, at once, on the ground to eliminate the needs for unloading items or debris individually, and for carrying harvest bag, trash bag, items, and debris of different shapes, sizes, and types per trip: a) to save time, money, and energies, b) to reduce fatigue, hand pain, and back pain, and c) to eliminate frustration; and
8) Multi-purpose, foldable dustpan, container, and handles for easy transportation and storage.

BRIEF SUMMARY OF THE INVENTION

A unique system comprises five different devices combined into one. All the five different devices can shift their shapes and functions while they are in motion, and can function simultaneously, as follows:
1) The system, functioning as an adjustable-width ground-flush wheelbarrow having multi-purpose foldable dustpan, can accommodate items of different sizes;
2) The system, functioning as an adjustable-width ground-flush wheel harvest-bag trash-bag caddy having multi-purpose foldable dustpan, can accommodate harvest bags and trash bags of different sizes;
3) The system, functioning as an adjustable-width ground-flush wheel tool-refreshment caddy having multi-purpose foldable dustpan, can accommodate garden tools and refreshment of different sizes;
4) The system, functioning as an adjustable-width ground-flush dump truck having multi-purpose foldable dustpan, can unload all its content at once; and
5) The system, functioning as an adjustable-width ground-flush hand truck having multi-purpose foldable dustpan, can accommodate stacked items of different sizes.

With the on-the-fly shape-shifting capability and on-the-fly function-shifting capability, the five-device-in-one system can eliminate the needs for stopping, putting down, unlocking, adjusting, relocking, and picking up the system.

The five-device-in-one system has the following unique features:
1) On-the-fly shape-shifting capability for changing the shape of the system and automatically locking it in that shape (while the system is in motion), to eliminate the needs for stopping, putting down, unlocking, adjusting, relocking, and picking up the system;
2) On-the-fly function-shifting capability for changing the function of the system and automatically locking it in that function (while the system is in motion), to eliminate the needs for stopping, putting down, unlocking, adjusting, relocking, and picking up the system;
3) On-the-fly width-adjusting capability for changing the width of the system and automatically locking it in that width (while the system is in motion), to carry items or debris of different shapes and sizes and to maneuver easily around objects;
4) Multi-purpose shock absorbers for absorbing shocks and vibrations to reduce fatigue and hand pain, and for functioning as the platform of a hand truck to carry items or debris stacked thereon;
5) Multi-purpose ground-flush dustpan and multi-purpose ground-flush harvest-bag trash-bag caddy:
   a) For conveniently loading and unloading items or debris, at ground level, to reduce fatigue and back pain,
   b) For conveniently holding down flat, at ground level, and protecting the edge of the mouth of a harvest bag, a trash bag, or the container of the system,
   c) For conveniently loading and unloading items or debris, at ground level, in a separate harvest bag or trash bag: to separate different items, to separate different debris, to separate harvested items from debris, and to eliminate the needs for cleaning and/or washing the system after every loading, unloading, and transportation of items or debris, and
   d) For conveniently bagging and/or discarding items and/or debris.
6) Expandable tool-carrying pockets for carrying a plurality of various long-handled tools, short-handled tools, work gloves, refreshments, etc., at the same time: a) to save time, money, and energies, b) to reduce fatigue, hand pain, and back pain, and c) to eliminate frustration;
7) Quick-release multi-purpose container for quickly releasing it from the frame(s) of the system to unload all carried items or debris, at once, on the ground to eliminate the needs for unloading items or debris individually, and for carrying harvest bag, trash bag, items, and debris of different shapes, sizes, and types per trip: a) to save time, money, and energies, b) to reduce fatigue, hand pain, and back pain, and c) to eliminate frustration; and
8) Multi-purpose, foldable dustpan, container, and handles for easy transportation and storage.

BRIEF DESCRIPTION OF THE SEVERAL VIEWS OF THE DRAWINGS

FIG. 3 illustrates the front view of an automatic multi-position locking device.

FIG. 4 illustrates the top view of the automatic multi-position locking device in operation.

FIGS. 5A and 5B illustrate the top and side views of a cylinder, respectively.

FIGS. 6A, and 6B illustrate the top and side views of an arm of the multi-position locking device, respectively.

FIGS. 10A, 10B, 11A, and 11B illustrate the side and top views of the left and right utility-bag spreaders, respectively.

FIG. 12 illustrates the quick-release multi-purpose container of the system.

FIGS. 16A and 16B illustrate the equivalents of the utility-bag spreader.

FIGS. 16C, 16D, 16E, and 16F illustrate the equivalents of the utility-bag spreader.

DETAILED DESCRIPTION OF THE INVENTION

Figure 1:
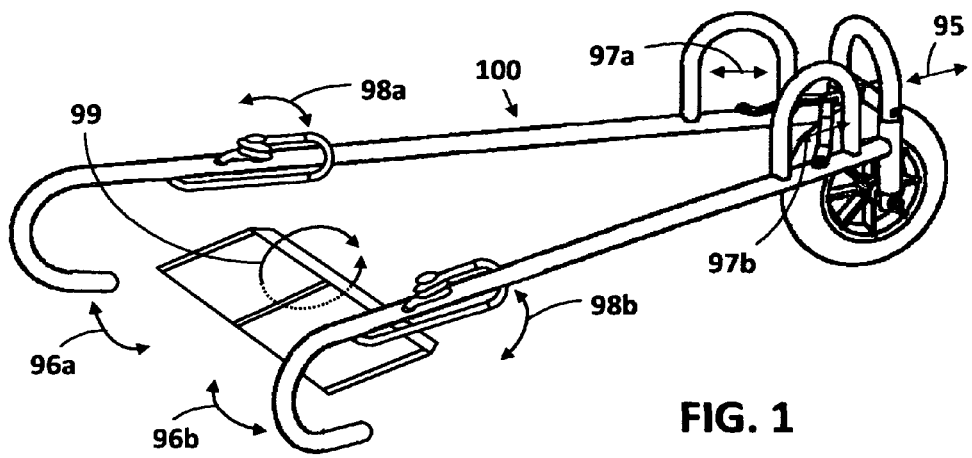
FIG. 1 illustrates a perspective view of the five-device-in-one system.

FIG. 1 illustrates a five-device-in-one system 100 without its quick-release multi-purpose container. Five-device-in-one system 100 can:

1) Shift its shape and function (while system 100 is in motion) by utilizing multi-position locking device and multi-purpose foldable handles, which can contract and expand in the opposite directions of arrow 95 and arrows 96a and 96b;
2) Absorb shocks and vibrations by utilizing multi-purpose shock absorbers, which can contract and expand in the opposite directions of arrows 97a and 97b;
3) Spread and lock harvest bag, trash bags, and tools in place by utilizing utility-bag spreaders, which can spring in the opposite directions of arrows 98a and 98b; and
4) Enhance its efficiency and convenience by utilizing multi-purpose foldable dustpan, which can flip in the opposite directions of arrow 99:
   a) To function as a dustpan to conveniently load and unload (especially small) items or debris,
   b) To function as a lift gate to open and close the mouth of the quick-release multi-purpose container of system 100,
   c) To protect the edge of the mouth of the quick-release multi-purpose container,
   d) To protect the edge of the mouth of a harvest bag or trash bag utilized with system 100,
   e) To hold down flat, at ground level, the edge of the mouth of the quick-release multi-purpose container, and to guide items or debris over the edge of the mouth of the quick-release multi-purpose container, and
   f) To hold down flat, at ground level, the edge of the mouth of a harvest bag or trash bag utilized with system 100, and to guide items or debris over the edge of the mouth of the harvest bag or trash bag.

Figure 2A:
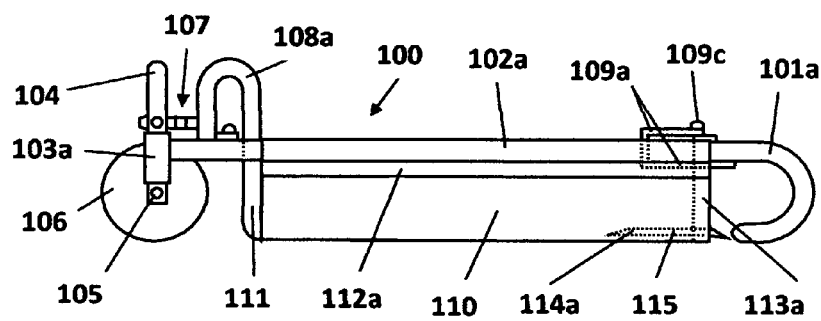
FIGS. 2A and 2B illustrate the left and right views of the five-device-in-one system.
Figure 2B:
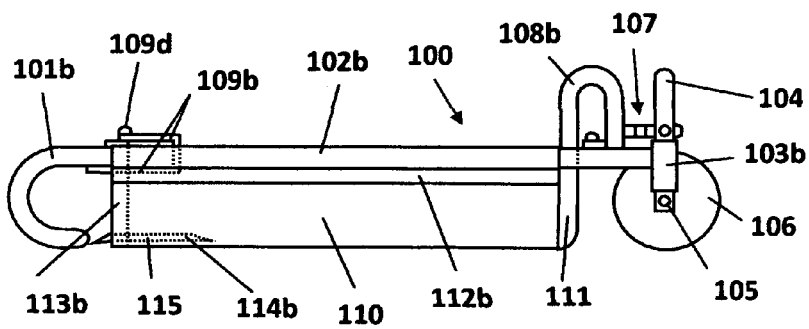

FIGS. 2A, and 2B illustrate five-device-in-one system 100, comprising five different devices combined into one. All the five different devices can shift their shapes and functions (while system 100 is in motion), and can function simultaneously as:

1) A wheelbarrow,
2) A wheel harvest-bag trash-bag caddy,
3) A wheel tool-refreshment caddy,
4) A dump truck, and
5) A hand truck.

Five-device-in-one system 100 comprises left and right multi-purpose foldable handles 101a and 101b, left and right frames 102a and 102b, left and right sleeves 103a and 103b, a roll bar 104, a nut-washer-axle combination 105, a wheel 106, a multi-position locking device 107, left and right multi-purpose shock absorbers 108a and 108b, left and right utility-bag spreaders 109a and 109b, left and right attaching screws 109c and 109d, a quick-release multi-purpose container 110, expandable tool-carrying pockets 111, left and right horizontal hooks and loops 112a and 112b, left and right vertical hooks and loops 113a and 113b, left and right dustpan hooks and loops 114a and 114b, and a multi-purpose foldable dustpan 115.

Multi-purpose foldable handle 101a is attached to frame 102a, which is attached to sleeve 103a, which is pivotally attached to roll bar 104, which is attached to nut-washer-axle combination 105.

Multi-purpose foldable handle 101b is attached to frame 102b, which is attached to sleeve 103b, which is pivotally attached to roll bar 104, which is attached to nut-washer-axle combination 105.

Wheel 106 is rotatably attached to nut-washer-axle combination 105.

Multi-purpose foldable handles 101a and 101b are predeterminedly ergonomically shaped to conform to various shapes and sizes of the hands of a person for comfort and good grip. If desired, each of handles 101a and 101b can be covered with a predetermined tube, made of material comfortable to the touch (for example, foam, rubber, plastic, fabric, a combination of at least two of the above, etc.), for extra comfort and extra grip.

Multi-position locking device 107 is attached to frames 102a and 102b and roll bar 104, by attaching component (for example, screw-washer-nut combinations or hitch pins).

Multi-purpose shock absorbers 108a and 108b are attached to frames 102a and 102b, respectively, by attaching component (for example, screw-washer-nut combinations or hitch pins).

Utility-bag spreaders 109a and 109b are pivotally attached to frames 102a and 102b, respectively, by attaching screws 109c and 109d (for example, screw-washer-nut combinations or hitch pins).

Quick-release multi-purpose container 110 is releasably attached to frames 102a and 102b by attaching screws 109c and 109d and by horizontal hooks and loops 112a and 112b, respectively.

Expandable tool-carrying pockets 111 are attached to the front and/or sides of multi-purpose container 110, respectively, by attaching component (for example, thread, rivet, glue, etc.).

Horizontal hooks and loops 112a and 112b are attached to the opposite, horizontal edges of multi-purpose container 110, respectively, by attaching component (for example, thread, rivet, glue, etc.).

Vertical hooks and loops 113a and 113b are attached to the opposite, vertical edges of the mouth of multi-purpose container 110, respectively, by attaching component (for example, thread, rivet, glue, etc.).

Dustpan hooks and loops 114a and 114b are attached to the opposite, short edges of multi-purpose foldable dustpan 115, respectively, by attaching component (for example, thread, rivet, glue, etc.).

Multi-purpose foldable dustpan 115 is attached to the ground-level, horizontal edge of the mouth of multi-purpose container 110 by attaching component (for example, thread, rivet, glue, etc.

Multi-purpose foldable handles 101a and 101b, frames 102a and 102b, sleeves 103a and 103b, roll bar 104, nut-washer-axle combination 105, attaching screws 109c and 109d, multi-position locking device 107 are, each partially or entirely, made of rigid material, semi-rigid material, etc.

Wheel 106 is, partially or entirely, made of rigid material, semi-rigid material, flexible material, a combination of at least two of the above materials, etc.

Multi-purpose shock absorbers 108a and 108b are, each partially or entirely, made of rigid material, semi-rigid material, flexible material, semi-flexible material, resilient material, semi-resilient material, a combination of at least two of the above materials, etc.

Utility-bag spreaders 109a and 109b are, each partially or entirely, made of rigid material, semi-rigid material, flexible material, semi-flexible material, resilient material, semi-resilient material, a combination of at least two of the above materials, etc.

Quick-release multi-purpose container 110, expandable tool-carrying pockets 111, horizontal hooks and loops 112a and 112b, vertical hooks and loops 113a and 113b, and dustpan hooks and loops 114a and 114b are, each partially or entirely, made of pliable material, elastic material, the like, the equivalent, a combination of at least two of the above materials, etc.

Multi-purpose foldable dustpan 115 is, partially or entirely, made of rigid material, semi-rigid material, pliable material, semi-pliable material, elastic material, semi-elastic material, metallic material, semi-metallic material, a combination of at least two of the above materials, etc. For example, multi-purpose foldable dustpan 115 can be made of fabric, nylon, vinyl, plastic, rubber, fiber glass, metal, the like, the equivalent, or a combination of at least two of the above materials.

For example, multi-purpose foldable dustpan 115 can comprise a piece of vinyl, rubber, or metal having at least one groove, which is disposed at predetermined location(s) thereon such that the piece can be folded.

For another example, multi-purpose foldable dustpan 115 can comprise a piece of vinyl or rubber and two pieces of fabric. The piece has at least one groove, which is disposed at predetermined location(s) thereon such that the piece can be folded. The piece is sewn, riveted, or glued between the two pieces of fabric.

For another example, multi-purpose foldable dustpan 115 can comprise two pieces of vinyl, rubber, or metal and two pieces of fabric. The two pieces of vinyl, rubber, or metal are disposed side by side with each other, and are sewn, riveted, or glued between the two pieces of fabric.

Sleeves 103a and 103b allow multi-purpose foldable handles 101a and 101b and frames 102a and 102b to pivot toward or away from each other.

Roll bar 104 protects wheel 106 and multi-position locking device 107, and attaches sleeves 103a and 103b to each other.

Multi-position locking device 107 allows five-device-in-one system 100 to shift its shape and function (while system 100 is in motion).

Each of multi-purpose shock absorbers 108a and 108b, having a predetermined flexibility:
 a) Can contract when an external force (for example, force from shocks and impacts) is applied thereto, and
 b) Can return to its former shape when the external force is removed, without any damage to itself.
 c) Can absorb shocks and vibrations generated by impacts between wheel 106 and the ground or an object when wheel 106 is moving thereon, to reduce users' fatigue and hand pain; and
 d) Carry items when the items are stacked thereon.
 e) Protect multi-position locking device 107, and
 f) Protect tools carried in expandable tool-carrying pockets 111.

Utility-bag spreaders 109a and 109b:
 a) Spread a harvest bag or trash bag wide open and lock the harvest bag or trash bag in place, and
 b) Lock long-handled tools (e.g. shovel, rake, broom, etc.) in place when they are inserted therethrough.

Quick-release multi-purpose container 110:
 a) Can be released quickly from frames 102a and 102b, and
 b) Can carry harvest bag, trash bag, tools, refreshment, items, debris, etc.

Expandable tool-carrying pockets 111 carry short-handled tools, work gloves, refreshments, etc.

Horizontal hooks and loops 112a and 112b can releasably attach multi-purpose container 110 to frames 102a and 102b, respectively.

Vertical hooks and loops 113a and 113b can releasably attach themselves to dustpan hooks and loops 114a and 114b, respectively, to releasably close the mouth of multi-purpose container 110 with multi-purpose foldable dustpan 115.

Multi-purpose foldable dustpan 115 (which can flip 360 degrees):
 Can function as a dustpan to conveniently load and unload (especially small) items or debris,
 Can function as the lift gate of multi-purpose container 110 to open and close the mouth of multi-purpose container 110,
 Can flip over the edge of the mouth of multi-purpose container 110, to protect the edge of the mouth of multi-purpose container 110, and to hold down flat, at ground level, the edge of the mouth of multi-purpose container 110 to guide items or debris over the edge of the mouth of multi-purpose container 110, and
 Can flip over the edge of the mouth of a harvest bag or trash bag, to protect the edge of the mouth of the harvest bag or trash bag, and to hold down flat, at ground level, the edge of the mouth of a harvest bag or trash bag to guide items or debris over the edge of the mouth of the harvest bag or trash bag.

Multi-Position Locking Device 107:

FIG. 3 illustrates the front view of multi-position locking device 107.

FIGS. 4, 5A, 5B, 6A, and 6B illustrate multi-position locking device 107 and its components, which comprises a cylinder 116, a plurality of cylinder recesses 117, cylinder-attaching screw 118, left and right arms 119a and 119b, left and right arm-attaching screws 120a and 120b, left and right locking balls 121a and 121b, left and right springs 122a and 122b, a housing 123, and left and right housing-attaching screws 124a and 124b.

Cylinder 116 is perpendicularly inserted through housing 123. Left and right locking balls 121a and 121b and left and right springs 122a and 122b are inserted into housing 121 through both opposite ends of housing 123, respectively. Housing 123 is attached to roll bar 104 by left and right housing-attaching screws 124a and 124b. Cylinder 116 is attached to left and right arms 119a and 119b by cylinder-attaching screw 118. Left and right arms 119a and 119b are attached to frames 102a and 102b by left and right arm-attaching screws 120a and 120b, respectively.

Figure 7:
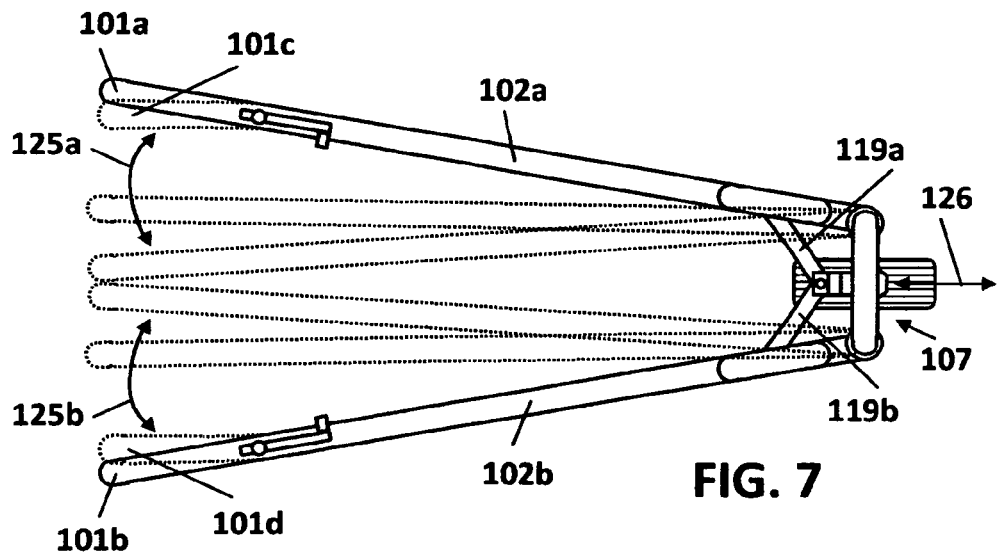
FIG. 7 illustrates the top view of the five-device-in-one system, which can be locked in a plurality of different positions to change its shape and function.

To change the shape and function of five-device-in-one system 100 while system 100 is in motion, left and right handles 101a and 101b, also functioning as on-the-fly shape-and-function-changing levers, can pivot toward or away from each other, in the opposite directions of arrows 125a and 125b, respectively, to move cylinder 116 in the directions of arrow 126 via left and right frames 102a and 102b and left and right arms 119a and 119b, respectively (as described hereunder in FIG. 7).

Multi-Purpose Foldable Handles 101a and 101b:

FIG. 7 illustrates how to change the shape and function of five-device-in-one system 100 while system 100 is in motion. To change the shape and function of five-device-in-one system 100 while system 100 is in motion, left and right handles 101a and 101b, also functioning as on-the-fly shape-and-function-changing levers, can pivot toward or away from each other, in the opposite directions of arrows 125a and 125b, respectively, to move cylinder 116 in the directions of arrow 126 via left and right frames 102a and 102b and left and right arms 119a and 119b, respectively, such that left and right springs 122a and 122b will be compressed and expanded to lock left and right locking balls 121a and 121b in one of cylinder recesses 117 with the clamping forces of left and right springs 122a and 122b, respectively, to lock left and right frames 102a and 102b in a desired position. As a result, five-device-in-one system 100 will be locked in a desired shape and function (for example, for work or for easy transportation and storage).

If desired, left and right handles 101a and 101b can be built such that left and right handles 101c and 101d are generally in a predetermined angle with respect to each other, or are generally parallel with each other (referring to left and right handles 101c and 101d in FIG. 7).

Figure 8:
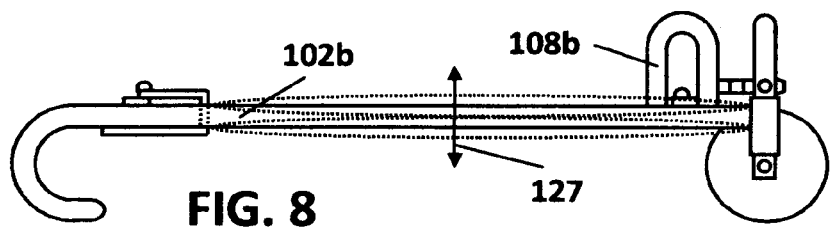
FIG. 8 illustrates the side view of the frames, bent downward by shocks and vibrations.
Figure 9A:
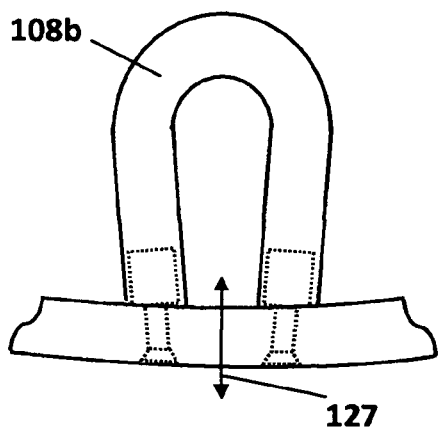
FIGS. 9A and 9B illustrate a multi-purpose shock absorber in operation.
Figure 9B:
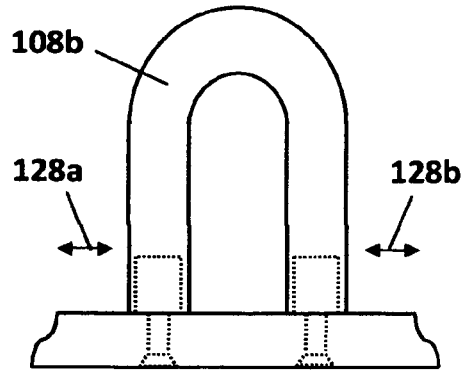

Multi-Purpose Shock Absorbers 108a and 108b:

FIGS. 8, 9A, and 9B illustrate how multi-purpose shock absorbers 108a and 108b absorb shocks and vibrations. For example, when the force from shocks and vibrations pull frame 102b in the opposite directions of arrow 127, multi-purpose shock absorber 108b contracts or expands to absorb the energies from the force, then, expands or contracts, respectively, to return the energies from the force, in the opposite directions of arrows 128a and 128b, to return frame 102b back to its former shape.

Utility-Bag Spreaders 109a and 109b:

FIGS. 10A, 10B, 11A, and 11B illustrate left and right utility-bag spreaders 109a and 109b, having left and right locking nipples 129a and 129b, respectively. Utility-bag spreaders 109a and 109b are resilient and pivotally attached to left and right frames 102a and 102b at predetermined locations, respectively, such that:
    a) When a harvest bag or trash bag is slid on utility-bag spreaders 109a and 109b, utility-bag spreaders 109a and 109b will spread the mouth of the harvest bag or trash bag wide open, and locking nipples 129a and 129b will lock it in place; and
    b) When tools are inserted through utility-bag spreaders 109a and 109b, utility-bag spreaders 109a and 109b will lock the tools in place (FIG. 12).

Quick-Release Multi-Purpose Container 110:

FIG. 12 illustrates left and right utility-bag spreaders 109a and 109b, quick-release multi-purpose container 110, expandable tool-carrying pockets 111, left and right horizontal hooks and loops 112a and 112b, left and right vertical hooks and loops 113a and 113b, left and right dustpan hooks and loops 114a and 114b, multi-purpose foldable dustpan 115. Multi-purpose container 110 has left and right edges 130a and edges 130b. Edges 130a can be attached to each other by attaching component (for example, thread, rivet, glue, hooks and loops, etc.). Edges 130b can be attached to each other by attaching component (for example, thread, rivet, glue, hooks and loops, etc.).

Multi-purpose container 110:
    a) Can quickly and easily be attached to and released from left and right frames 102a and 102b by assembling and disassembling left and right horizontal hooks and loops 112a and 112b, respectively;
    b) Can carry long-handled tools, short-handled tools, work gloves, refreshment, etc.;
    c) Can carry harvest bag or trash bag of items or debris and other items or debris, at the same time, without mixing them together; and
    d) Can be folded and unfolded (for example, for work or for easy transportation and storage).

Multi-Purpose Foldable Dustpan 115:

FIG. 12 illustrates multi-purpose foldable dustpan 115. Multi-purpose foldable dustpan 115 has at least one groove 131 disposed at predetermined location(s) such that multi-purpose foldable dustpan 115 can be folded, for example, when shifting the shape and function of five-device-in-one system 100. Multi-purpose foldable dustpan 115 can be flipped 360 degrees in the opposite directions of arrow 132.

Figure 13A:
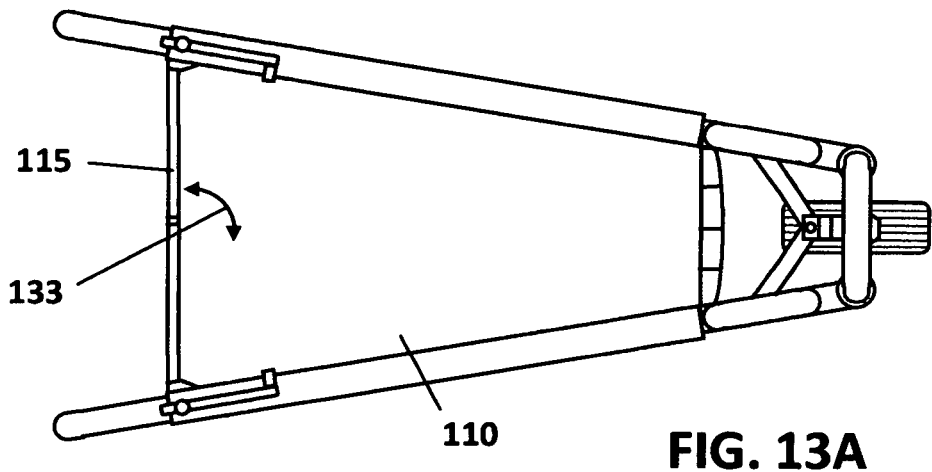
FIGS. 13A, 13B, 13C, and 13D illustrate a multi-purpose foldable dustpan in different positions for different functions, respectively.

FIG. 13A illustrates multi-purpose foldable dustpan 115, which can be flipped upward or downward in the opposite directions of arrow 133, to function as a lift gate:
    a) To open the mouth of multi-purpose container 110; and
    b) To close the mouth of multi-purpose container 110.

Figure 13B:
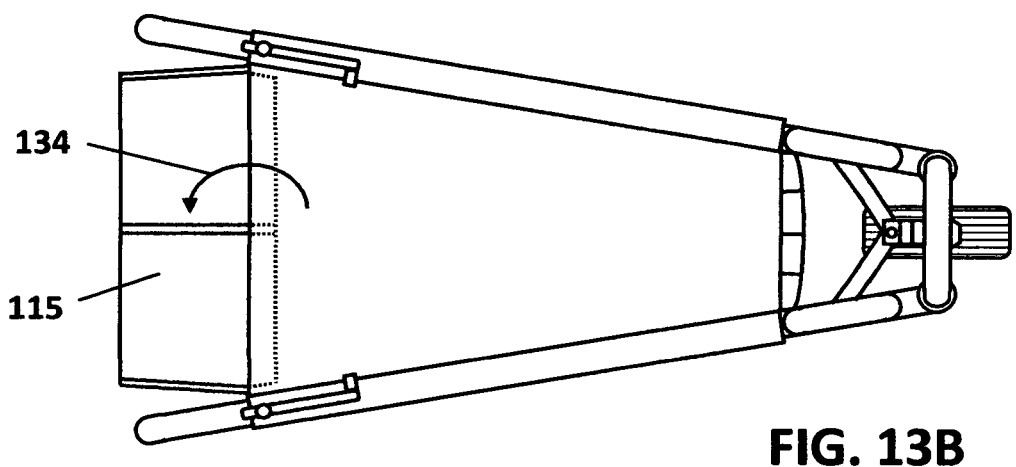

FIG. 13B illustrates multi-purpose foldable dustpan 115, which can be flipped outward in the direction of arrow 134 over the edge of the mouth of multi-purpose container 110 to function as a dustpan:
    a) To protect the edge of the mouth of multi-purpose container 110; and
    b) To hold down flat, at ground level, the edge of the mouth of multi-purpose container 110 to guide items or debris over the edge of the mouth of multi-purpose container 110.

Figure 13C:
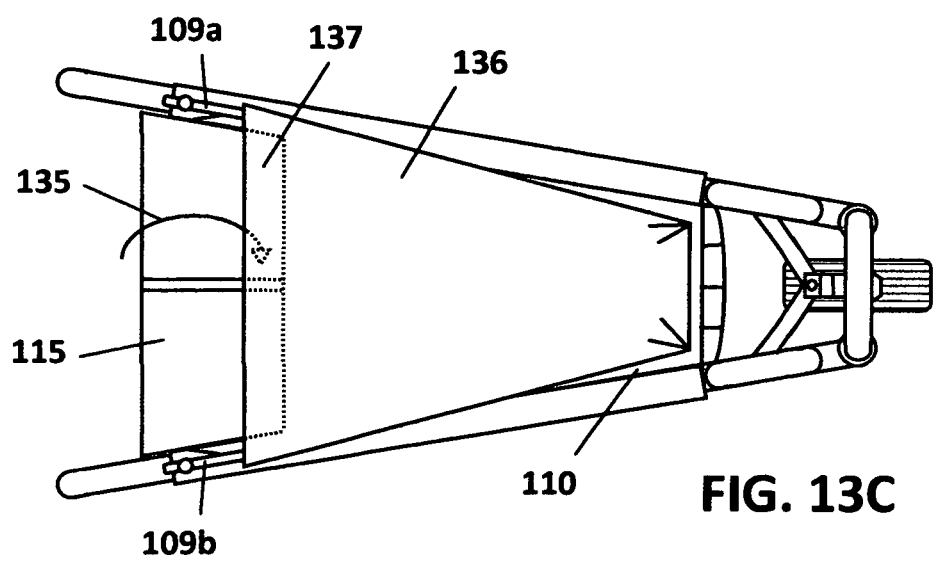

FIG. 13C illustrates multi-purpose foldable dustpan 115, which can be flipped inward in the direction of arrow 135 over the bottom edge of the mouth of a harvest bag or trash bag 136 to function as a dustpan:
    a) To protect the bottom edge of the mouth of harvest bag or trash bag 136;
    b) To hold down flat, at ground level, the bottom edge of the mouth of harvest bag or trash bag 136 to guide items or debris over the bottom edge of the mouth of harvest bag or trash bag 136;
    c) To conveniently carry harvest bag or trash bag 136 around, and to conveniently set harvest bag or trash bag 136 down, at ground level;
    d) To conveniently rake or sweep items or debris directly into harvest bag or trash bag 136;

e) To conveniently bag items or debris contained in harvest bag or trash bag 136, without the needs for cleaning and washing multi-purpose container 110 after every loading, unloading, and transportation of items or debris; and f) To conveniently separate items or debris contained in harvest bag or trash bag 136 from items or debris contained in multi-purpose container 110.

Further, if desired, the top edge 137 of the mouth of harvest bag or trash bag 136 can be locked, by left and right utility-bag spreaders 109a and 109b, in a forward-leaning position for ease of loading and unloading.

Figure 13D:
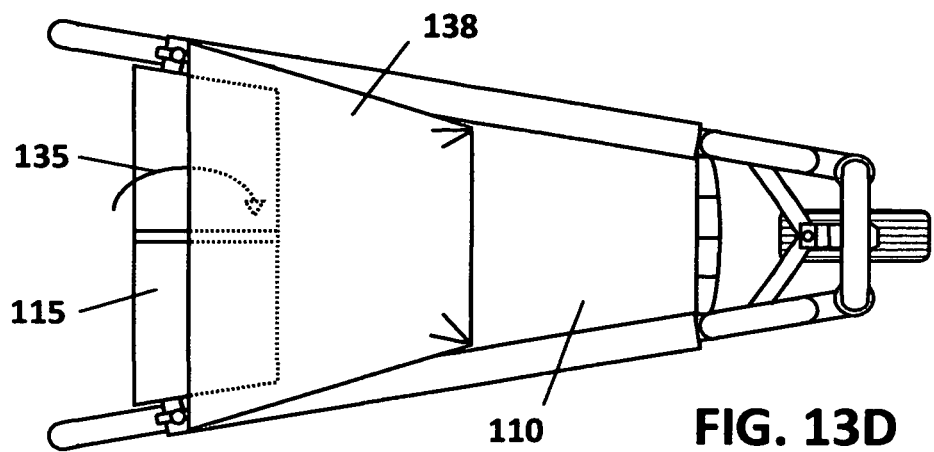

FIG. 13D illustrates multi-purpose foldable dustpan 115, which can be flipped inward in the direction of arrow 135 over the bottom edge of the mouth of a harvest bag or trash bag 138 of different size to function as a dustpan (as described and illustrated in FIG. 13C above).

Figure 14A:
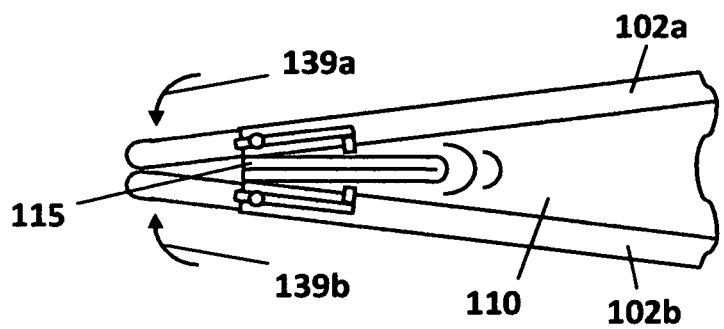
FIGS. 14A, 14B, and 14C illustrate the handles, frames, and the multi-purpose foldable dustpan in different folded positions for easy transportation and storage.
Figure 14B:
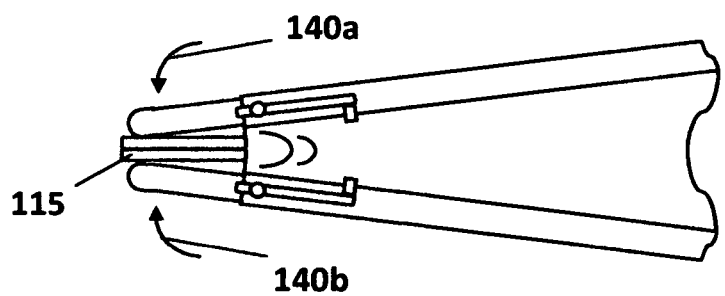
Figure 14C:
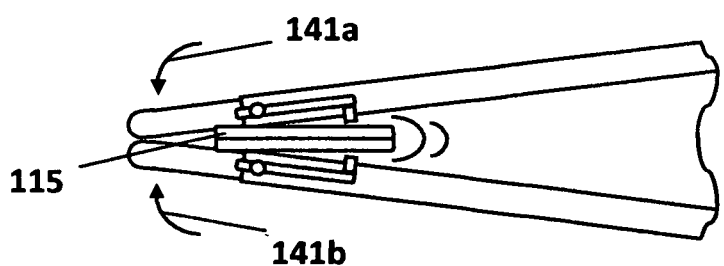

FIG. 14A illustrates multi-purpose foldable dustpan 115 (from FIG. 13A) in a folded position when frames 102a and 102b are folded together in the directions of arrows 139a and 139b. FIG. 14B illustrates multi-purpose foldable dustpan 115 (from FIG. 13B) in a folded position when frames 102a and 102b are folded together in the directions of arrows 140a and 140b. FIG. 14C illustrates multi-purpose foldable dustpan 115 (from FIG. 13C) in a folded position when frames 102a and 102b are folded together in the directions of arrows 141a and 141b.

Figure 15A:
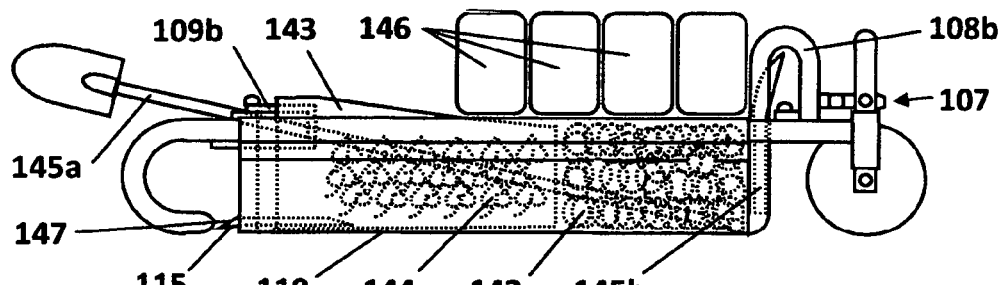
FIGS. 15A, 15B, 15C, and 15D illustrate the five-device-in-one system in operation.

FIG. 15A illustrates five-device-in-one system 100, having multi-purpose shock absorbers 108a and 108b (to absorb shocks and vibrations), multi-position locking device 107 (to shift the shape and function of system 100), utility-bag spreaders 109a and 109b (to spread wide open harvest bag or trash bag and lock it in place), and multi-purpose foldable dustpan 115 (to conveniently load and unload items or debris).

System 100 comprises five different devices combined into one. All the five different devices can shift their shapes and functions (while they are in motion), and can function simultaneously, as follows:

1) System 100, functioning as an adjustable-width ground-flush wheelbarrow having multi-purpose foldable dustpan 115, can accommodate a whole load of, for example, cucumbers 142;
2) System 100, functioning as an adjustable-width ground-flush wheel harvest-bag trash-bag caddy having multi-purpose foldable dustpan 115, can accommodate harvest bag or trash bag 143 of items or debris 144;
3) System 100, functioning as an adjustable-width ground-flush wheel tool-refreshment caddy, having multi-purpose foldable dustpan 115, can accommodate long-handled garden tools 145a and short-handled garden tools and refreshment 145b;
4) System 100, functioning as an adjustable-width ground-flush dump truck, having multi-purpose foldable dustpan 115, can unload the whole load of cucumbers 142 at once (FIG. 15D); and
5) System 100, functioning as an adjustable-width ground-flush hand truck, having multi-purpose foldable dustpan 115, can accommodate a plurality of, for example, bark bags 146.

Figure 15B:
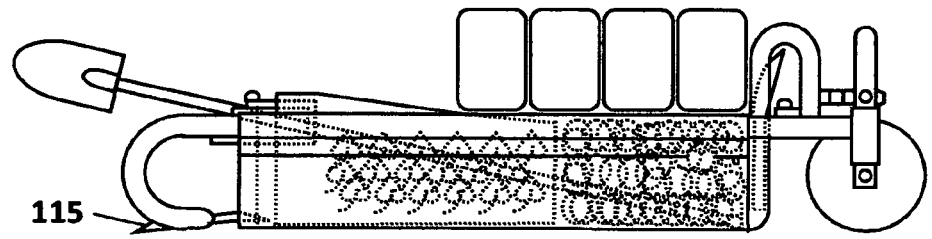
Figure 15C:
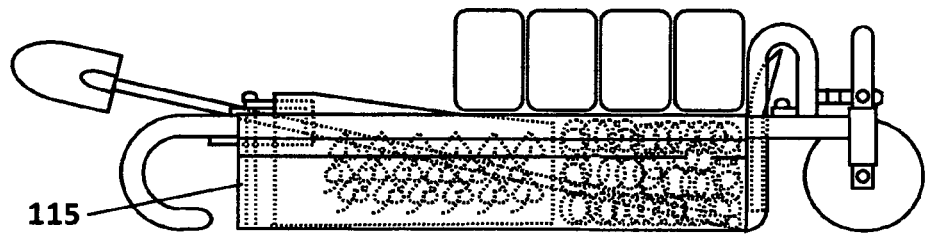

FIGS. 15A, 15B, and 15C illustrate multi-purpose foldable dustpan 115. Multi-purpose foldable dustpan 115 has at least one tapered edge 147 (FIG. 15A) to easily guide items or debris thereover for ease of loading and unloading. Multi-purpose foldable dustpan 115 can flip inward over the bottom edge of the mouth of harvest bag or trash bag 143 (FIG. 15A), can flip outward over the bottom edge of the mouth of multi-purpose container 110 (FIG. 15B), and can flip upward over the bottom edge of the mouth of multi-purpose container 110 (FIG. 15C):

a) To function as a dustpan to conveniently load and unload items or debris 144 into harvest bag or trash bag 143 and multi-purpose container 110 (FIGS. 15A and 15B);
b) To function as a lift gate to open and close the mouth of harvest bag or trash bag 143 and the mouth of multi-purpose container 110 (FIG. 15C);
c) To protect the bottom edge of the mouth of multi-purpose container 110;
d) To protect the bottom edge of the mouth of harvest bag or trash bag 143;
e) To hold down flat, at ground level, the bottom edge of the mouth of multi-purpose container 110, and to guide cucumbers 142 over the bottom edge of the mouth of multi-purpose container 110; and
f) To hold down flat, at ground level, the bottom edge of the mouth of harvest bag or trash bag 143, and to guide items or debris 144 over the bottom edge of the mouth of harvest bag or trash bag 143.

Figure 15D:
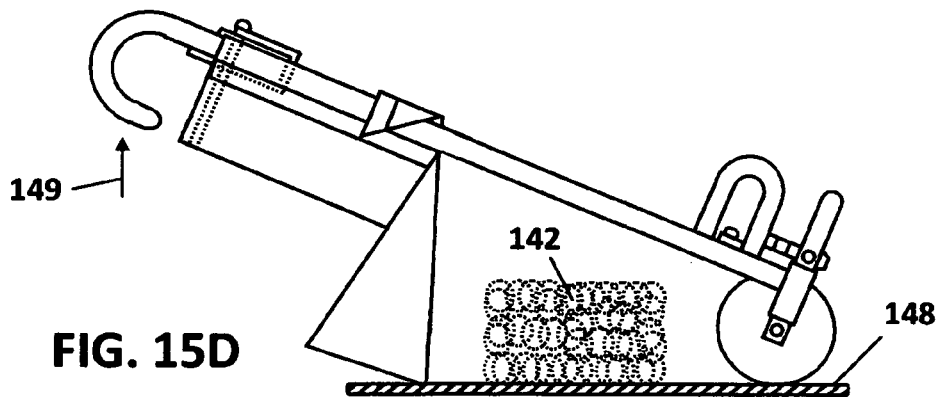

FIG. 15D illustrates five-device-in-one system 100 functioning as a dump truck. To unload the whole load of cucumbers 142 at once, on the ground 148:

a) Detach horizontal hooks and loops 112a and 112b; and
b) Lift handles 101a and 101b upward in the direction of arrow 149.

Referring to FIGS. 15A, 15B, 15C, and 15D, to load up the five-device-in-one system 100, a user lays the five-device-in-one system 100 on the ground. Next, the user stores refreshment and garden tools in their respective expandable pockets 111 (the user uses the five-device-in-one system 100 as a wheel tool-refreshment caddy). Next, the user folds dustpan 115 down flat outwards, at ground level. Next, the user sweeps, for example, filberts on the ground into container 110 (the user uses the five-device-in-one system 100 as a wheelbarrow). the Next, the user spreads open a bag and holds it inside container 110, by using spreaders 109a and 109b. Next, the user folds dustpan 115 down flat inwards, at ground level. Next, the user sweeps debris on the ground into the bag (the user uses the five-device-in-one system 100 as a wheel harvest-bag trash-bag caddy). Next, the user folds dustpan 115 up and secure it, by using dustpan hooks and loops 114a and 114b. Next, the user stacks, for example, soil bags on left and right frames 102a and 102b (the user uses the five-device-in-one system 100 as a hand truck). Next the user picks up handle 101a and 101b and pushes the five-device-in-one system 100 to carry the refreshment, garden tools, filberts, debris, and soil bags to a desired location. Next, the user lays the five-device-in-one system 100 on the ground. Next, the user unloads the refreshment, garden tools, debris, and soil bags. Next, the user unloads the filberts on the ground, by pulling the left and right edges of container 110 away from left and right frames 102a and 102b to separate the left and right edges of container 110 from left and right frames 102a and 102b, and by lifting handles 101a and 101b up to dump the filberts on the ground and to move the five-device-in-one system 100 away from the filberts (the user uses the five-device-in-one system 100 as a dump truck).

FIG. 16A illustrates utility-bag spreaders 150a and 150b, each of which is equivalent to one of utility-bag spreaders 109a and 109b (FIGS. 2A and 2B). Equivalent utility-bag spreader 150a is a predetermined hook having at least one optional locking nipple 150c. Equivalent utility-bag spreader 150b is a predetermined hook having at least one optional locking nipple 150d. Each of locking nipples 150c and 150d is equivalent to one of locking nipples 129a and 129b of utility-bag spreaders 109a and 109b (FIGS. 10A and 11B). Similarly, equivalent utility-bag spreaders 150a and 150b can replace utility-bag spreaders 109a and 109b, and can be attached to frames 102a and 102b, respectively.

To spread and lock a harvest bag or trash bag, slide the edge of the mouth of the harvest bag or trash bag on equivalent utility-bag spreaders 150a and 150b such that the tips of equivalent utility-bag spreaders 150a and 150b and locking nipples 150c and 150d poke through the edge of the mouth of the harvest bag or trash bag at predetermined locations thereon.

FIG. 16B illustrates utility-bag spreaders 151a and 151b, each of which is equivalent to one of utility-bag spreaders 109a and 109b (FIGS. 2A and 2B). Each of equivalent utility-bag spreaders 151a and 151b is a predetermined spring-loaded clamp. Similarly, equivalent utility-bag spreaders 151a and 151b can replace utility-bag spreaders 109a and 109b, and can be attached to frames 102a and 102b, respectively.

To spread and lock a harvest bag or trash bag, slide the edge of the mouth of a harvest bag or trash bag between the jaws of equivalent utility-bag spreaders 151a and 151b such that equivalent utility-bag spreaders 150a and 150b clamp on the edge of the mouth of the harvest bag or trash bag at predetermined locations thereon.

FIG. 16C illustrates a utility-bag spreader, which is equivalent to and functions similarly to one of utility-bag spreaders 151a and 151b (FIG. 16B). The equivalent utility-bag spreader is a predetermined spring-loaded clamp having jaws 152.

FIGS. 16D and 16E illustrate the side and top views of a utility-bag spreader, which is equivalent to one of utility-bag spreaders 109a and 109b (FIGS. 2A and 2B). The equivalent utility-bag spreader is a predetermined hook having at least one optional locking nipple 153, equivalent to one of locking nipples 129a and 129b of utility-bag spreaders 109a and 109b (FIGS. 10A and 11B). Similarly, two of the equivalent utility-bag spreaders can replace utility-bag spreaders 109a and 109b, and can be attached to frames 102a and 102b, respectively. To spread and lock a harvest bag or trash bag, slide the edge of the mouth of the harvest bag or trash bag on the equivalent utility-bag spreaders such that the tips of the equivalent utility-bag spreaders and locking nipples 153 poke through the edge of the mouth of the harvest bag or trash bag at predetermined locations thereon.

FIG. 16F illustrates a utility-bag spreader, which is equivalent to one of utility-bag spreaders 109a and 109b (FIGS. 2A and 2B). The equivalent utility-bag spreader is a predetermined single- or double-headed hook having at least one optional locking nipple 154, equivalent to one of locking nipples 129a and 129b of utility-bag spreaders 109a and 109b (FIGS. 10A and 11B). Similarly, two of the equivalent utility-bag spreaders can replace utility-bag spreaders 109a and 109b, and can be attached to frames 102a and 102b, respectively.

To spread and lock a harvest bag or trash bag, slide the edge of the mouth of the harvest bag or trash bag on the equivalent utility-bag spreaders such that the tips of the equivalent utility-bag spreaders and locking nipples 154 poke through the edge of the mouth of the harvest bag or trash bag at predetermined locations thereon.

Each component of the system can have any shape and size. The five-device-in-one system can have at least one utility-bag spreader. Each utility-bag spreader can be attached to any component of the five-device-in-one system at any predetermined location. For example, at least one utility-bag spreader can be attached to the frame, handle, roll bar, container, and/or dustpan of the five-device-in-one system The unique system comprises five different devices combined into one. All the five different devices can function simultaneously, and can shift their shapes and functions while they are in motion.

With the on-the-fly shape-shifting capability and on-the-fly function-shifting capability, the five-device-in-one system can eliminate the needs for stopping, putting down, unlocking, adjusting, relocking, and picking up the system.

The five-device-in-one system has the following unique features:
1) On-the-fly shape-shifting capability for changing the shape of the system and automatically locking it in that shape (while the system is in motion), to eliminate the needs for stopping, putting down, unlocking, adjusting, relocking, and picking up the system;
2) On-the-fly function-shifting capability for changing the function of the system and automatically locking it in that function (while the system is in motion), to eliminate the needs for stopping, putting down, unlocking, adjusting, relocking, and picking up the system;
3) On-the-fly width-adjusting capability for changing the width of the system and automatically locking it in that width (while the system is in motion), to carry items or debris of different shapes and sizes and to maneuver easily around objects;
4) Multi-purpose shock absorbers for absorbing shocks and vibrations to reduce fatigue and hand pain, and for functioning as the platform of a hand truck to carry items or debris stacked thereon;
5) Multi-purpose ground-flush dustpan and multi-purpose ground-flush harvest-bag trash-bag caddy:
    a) For conveniently loading and unloading items or debris, at ground level, to reduce fatigue and back pain,
    b) For conveniently holding down flat, at ground level, and protecting the edge of the mouth of a harvest bag, a trash bag, or the container of the system,
    c) For conveniently loading and unloading items or debris, at ground level, in a separate harvest bag or trash bag: to separate different items, to separate different debris, to separate harvested items from debris, and to eliminate the needs for cleaning and/or washing the system after every loading, unloading, and transportation of items or debris, and
    d) For conveniently bagging and/or discarding items and/or debris.
6) Expandable tool-carrying pockets for carrying a plurality of various long-handled tools, short-handled tools, work gloves, refreshments, etc., at the same time: a) to save time, money, and energies, b) to reduce fatigue, hand pain, and back pain, and c) to eliminate frustration;
7) Quick-release multi-purpose container for quickly releasing it from the frame(s) of the system to unload all carried items or debris, at once, on the ground to eliminate the needs for unloading items or debris individually, and for carrying harvest bag, trash bag, items, and debris of different shapes, sizes, and types per trip: a) to save time, money, and energies, b) to reduce fatigue, hand pain, and back pain, and c) to eliminate frustration; and
8) Multi-purpose, foldable dustpan, container, and handles for easy transportation and storage.

What is claimed is:
1. A system of a wheelbarrow, a wheel harvest-bag trash-bag caddy, a wheel tool-refreshment caddy, a dump truck, and a hand truck comprising:

an axle assemblage comprising a threaded axle and axle-attaching nuts and bolts;

a wheel, said threaded axle inserted though said wheel such that said wheel is rotatably attached to said threaded axle;

a roll bar, said roll bar having first and second roll-bar openings and first and second roll-bar ends, said first and second roll-bar openings disposed at said first and second roll-bar ends, respectively;

first and second sleeve members, said first and second roll-bar ends inserted through said first and second sleeve members respectively such that said first and second sleeve members are pivotally attached to said roll bar, said threaded axle inserted though said first and second roll-bar openings and secured to said roll bar by said axle-attaching nuts and bolts such that said roll bar is attached to said axle assemblage;

first and second frame members, said first and second frame members attached to said first and second sleeve members respectively such that said first and second frame members are able to pivot laterally;

first and second shock-absorbing U-shaped bars for absorbing shock and vibration and for carrying elements stacked thereon;

first and second absorber-attaching nuts and bolts, said first and second shock-absorbing U-shaped bars attached to said first and second frame members by said first and second absorber-attaching nuts and bolts, respectively;

automatic multi-position lock for locking the system, said automatic multi-position lock comprising an adjustable cylinder having a plurality of cylinder recesses thereon, cylinder-attaching rivet, first and second arms, first and second arm-attaching rivets, first and second locking balls, first and second locking springs, first and second housing-attaching nuts and bolts, and a housing having a central opening and first and second openings, said adjustable cylinder inserted through said central opening of said housing, said first and second locking balls and said first and second locking springs inserted into said first and second openings of said housing respectively, said housing attached to said roll bar by said first and second housing-attaching nuts and bolts to press said first and second locking balls against said cylinder recesses with pressure from said first and second locking springs to lock said adjustable cylinder in place, said adjustable cylinder attached to said first and second arms by said cylinder-attaching rivet, said first and second arms attached to said first and second frame members by said first and second arm-attaching rivets respectively such that said first and second frame members can pivot laterally to move said cylinder in opposite directions via said first and second arms to lock said first and second locking balls in one of said cylinder recesses to lock the system;

first and second handle members, said first and second handle members attached to said first and second frame members, respectively;

first and second bag-spreaders, said first and second bag-spreaders for spreading a bag open and for locking a bag in place;

first and second spreader-attaching screws, said first and second bag-spreaders attached to said first and second frame members by said first and second spreader-attaching screws, respectively;

a quick-release container, said quick-release container having a container mouth, said quick-release container for carrying bag and elements and for conveniently dumping its content;

first and second container-attaching hooks and loops, said quick-release container releasably attached to said first and second frame members by said first and second container-attaching hooks and loops and by said first and second spreader-attaching screws respectively;

tool-and-refreshment-carrying pockets, said tool-and-refreshment-carrying pockets for carrying tools and refreshments;

carrier-attaching hooks and loops, said tool-and-refreshment-carrying pockets attached to said quick-release container by said carrier-attaching hooks and loops;

a dustpan; and dustpan-attaching hooks and loops, said dustpan attached to said quick-release container by said dustpan-attaching hooks and loops such that said dustpan is capable of laying flat at ground level and capable of releasably closing said container mouth, whereby, provided is the system of said wheelbarrow, said wheel harvest-bag trash-bag caddy, said wheel tool-refreshment caddy said dump truck, and said hand truck.

2. The system of a wheelbarrow, a wheel harvest-bag trash-bag caddy, a wheel tool-refreshment caddy, a dump truck, and a hand truck of claim 1, wherein said automatic multi-position lock locking said first and second frame members in an angular position.

3. The system of a wheelbarrow, a wheel harvest-bag trash-bag caddy, a wheel tool-refreshment caddy, a dump truck, and a hand truck of claim 1, wherein said automatic multi-position lock locking said first and second frame members in a parallel position.

4. The system of a wheelbarrow, a wheel harvest-bag trash-bag caddy, a wheel tool-refreshment caddy, a dump truck, and a hand truck of claim 1, wherein said automatic multi-position lock locking said first and second frame members next to each other.

5. The system of a wheelbarrow, a wheel harvest-bag trash-bag caddy, a wheel tool-refreshment caddy, a dump truck, and a hand truck of claim 1, wherein said first and second shock-absorbing U-shaped bars resilient.

6. The system of a wheelbarrow, a wheel harvest-bag trash-bag caddy, a wheel tool-refreshment caddy, a dump truck, and a hand truck of claim 1, wherein said dustpan foldable.

7. The system of a wheelbarrow, a wheel harvest-bag trash-bag caddy, a wheel tool-refreshment caddy, a dump truck, and a hand truck of claim 1, wherein said first and second bag-spreaders comprising first and second spring wires, respectively.

8. The system of a wheelbarrow, a wheel harvest-bag trash-bag caddy, a wheel tool-refreshment caddy, a dump truck, and a hand truck of claim 1, wherein said first and second bag-spreaders comprising first and second spring-loaded clamps, respectively.

9. The system of a wheelbarrow, a wheel harvest-bag trash-bag caddy, a wheel tool-refreshment caddy, a dump truck, and a hand truck of claim 1, wherein said first and second bag-spreaders comprising first and second single-headed or double-headed hooks, respectively.

10. The system of a wheelbarrow, a wheel harvest-bag trash-bag caddy, a wheel tool-refreshment caddy, a dump truck, and a hand truck of claim 1, further comprising a bag attached to said first and second bag-spreaders for bagging elements, separately and conveniently.

11. The system of a wheelbarrow, a wheel harvest-bag trash-bag caddy, a wheel tool-refreshment caddy, a dump truck, and a hand truck of claim 10, wherein said bag having a mouth, said mouth having a bottom edge, said dustpan laying over said bottom edge of said mouth for ease of loading and unloading elements into and out of said bag, respectively.

12. The system of a wheelbarrow, a wheel harvest-bag trash-bag caddy, a wheel tool-refreshment caddy, a dump truck, and a hand truck of claim 1, wherein said first and second container-attaching hooks and loops being flexible.

13. The system of a wheelbarrow, a wheel harvest-bag trash-bag caddy, a wheel tool-refreshment caddy, a dump truck, and a hand truck of claim 1, wherein said carrier-attaching hooks and loops being flexible such that said quick-release container can quickly be detached from said first and second frame members.

14. The system of a wheelbarrow, a wheel harvest-bag trash-bag caddy, a wheel tool-refreshment caddy, a dump truck, and a hand truck of claim 1, wherein said carrier-attaching hooks and loops made of thread.

15. The system of a wheelbarrow, a wheel harvest-bag trash-bag caddy, a wheel tool-refreshment caddy, a dump truck, and a hand truck of claim 1, wherein said tool-and-refreshment-carrying pockets made of expandable material.

16. The system of a wheelbarrow, a wheel harvest-bag trash-bag caddy, a wheel tool-refreshment caddy, a dump truck, and a hand truck of claim 1, wherein said quick-release container made of pliable material.

17. A system of a wheelbarrow, a wheel harvest-bag trash-bag caddy, a wheel tool-refreshment caddy, a dump truck, and a hand truck comprising first and second handles, first and second frames, first and second sleeves, a roll bar, an axle assemblage, a wheel, automatic multi-position lock, first and second shock-absorbing U-shaped bars, first and second absorber-attaching nuts and bolts, first and second bag-spreaders, first and second spreader-attaching screws, a quick-release container, first and second container-attaching hooks and loops, tool-and-refreshment-carrying pockets, carrier-attaching hooks and loops, dustpan-attaching hooks and loops, and a dustpan, said automatic multi-position lock for locking the system, said automatic multi-position lock comprising an adjustable cylinder having a plurality of cylinder recesses thereon, cylinder-attaching rivets, first and second arms, first and second arm-attaching rivets, first and second locking balls, first and second locking springs, first and second housing-attaching nuts and bolts, and a housing having a central opening and first and second openings, said adjustable cylinder inserted through said central opening of said housing, said first and second locking balls and said first and second locking springs inserted into said first and second openings of said housing respectively, said housing attached to said roll bar by said first and second housing-attaching nuts and bolts to press said first and second locking balls against said cylinder recesses with pressure from said first and second locking springs to lock said adjustable cylinder in place, said adjustable cylinder attached to said first and second arms by said cylinder-attaching rivets, said first and second arms attached to said first and second frames by said first and second arm-attaching rivets respectively such that said first and second frames can pivot laterally to move said adjustable cylinder in opposite directions via said first and second arms to lock said first and second locking balls in one of said cylinder recesses to lock the system, said axle assemblage comprising a threaded axle and axle-attaching nuts and bolts, said first and second handles attached to said first and second frames respectively, said first and second frames attached to said first and second sleeves respectively, said first and second sleeves pivotally attached to said roll bar, said roll bar attached to said axle assemblage, said wheel rotatably attached to said axle assemblage, said first and second shock-absorbing U-shaped bars attached to said first and second frames by said first and second absorber-attaching nuts and bolts respectively, said first and second bag-spreaders attached to said first and second frames by said first and second spreader-attaching screws respectively, said quick-release container releasably attached to said first and second frames by said first and second spreader-attaching screws and by said first and second container-attaching hooks and loops respectively, said tool-and-refreshment-carrying pockets attached to said quick-release container by said carrier-attaching hooks and loops, said dustpan attached to said quick-release container by said dustpan-attaching hooks and loops such that said dustpan is capable of laying flat at ground level and capable of releasably closing the mouth of said quick-release container, said first and second frames able to pivot laterally, said automatic multi-position lock for locking the system while the system is in motion or not in motion, said first and second shock-absorbing U-shaped bars for absorbing shock and vibration and for carrying elements stacked thereon, said first and second bag-spreaders for spreading a bag open and for locking a bag in place, said quick-release container for carrying bag and elements and for conveniently dumping its content, said tool-and-refreshment-carrying pockets for carrying tools and refreshments, said first and second frames for rotating toward or away from each other to move said adjustable cylinder via said first and second arms to lock said first and second locking balls in one of said cylinder recesses to lock the system, whereby, provided is the system of said wheelbarrow, said wheel harvest-bag trash-bag caddy, said wheel tool-refreshment caddy, said dump truck, and said hand truck.

18. The system of a wheelbarrow, a wheel harvest-bag trash-bag caddy, a wheel tool-refreshment caddy, a dump truck, and a hand truck of claim 17, wherein said automatic multi-position lock locking said first and second frames in an angular or parallel position.

19. The system of a wheelbarrow, a wheel harvest-bag trash-bag caddy, a wheel tool-refreshment caddy, a dump truck, and a hand truck of claim 17, wherein said dustpan foldable.

20. The system of a wheelbarrow a wheel harvest-bag trash-bag caddy, a wheel tool-refreshment caddy, a dump truck, and a hand truck of claim 17, further comprising a bag attached thereto for bagging elements, separately and conveniently.

* * * * *